(12) United States Patent
Yang et al.

(10) Patent No.: US 7,296,803 B2
(45) Date of Patent: Nov. 20, 2007

(54) CHUCK

(75) Inventors: Guimo Yang, Shandong Province (CN); Xingda Tan, Shandong Province (CN)

(73) Assignee: Shandong Weida Machinery Co., Ltd., Wendeng, Shandong Province (CN)

( * ) Notice: Subject to any disclaimer, the term of this patent is extended or adjusted under 35 U.S.C. 154(b) by 503 days.

(21) Appl. No.: 10/480,358

(22) PCT Filed: Jun. 6, 2002

(86) PCT No.: PCT/CN02/00399

§ 371 (c)(1), (2), (4) Date: Jun. 18, 2004

(87) PCT Pub. No.: WO02/100584

PCT Pub. Date: Dec. 19, 2002

(65) Prior Publication Data

US 2004/0217558 A1     Nov. 4, 2004

(30) Foreign Application Priority Data

Jun. 10, 2001   (CN) .............................. 01 1 15015

(51) Int. Cl.
*B23B 31/12*   (2006.01)

(52) U.S. Cl. .......................... 279/62; 279/60; 279/61; 279/125; 279/140; 279/157; 279/902

(58) Field of Classification Search ............ 279/60–62, 279/125, 140, 157, 902
See application file for complete search history.

(56) References Cited

U.S. PATENT DOCUMENTS

| | | | | |
|---|---|---|---|---|
| 5,031,925 A * | 7/1991 | Tatsu et al. | .................... | 279/64 |
| 5,741,016 A * | 4/1998 | Barton et al. | .................. | 279/62 |
| 5,816,582 A * | 10/1998 | Steadings et al. | ............. | 279/62 |
| 5,829,761 A * | 11/1998 | Rohm | .......................... | 279/62 |
| 5,957,469 A * | 9/1999 | Miles et al. | .................. | 279/62 |
| 6,722,668 B2 * | 4/2004 | Huggins et al. | .............. | 279/29 |

OTHER PUBLICATIONS

US 6,406,035, 06/2002, Grogan et al. (withdrawn)

* cited by examiner

*Primary Examiner*—Monica Carter
*Assistant Examiner*—Sara Addisu
(74) *Attorney, Agent, or Firm*—Kenyon & Kenyon LLP (57) ABSTRACT

The present invention relates to a self-tightened reverse locking chuck, comprising: a body member, a nut, jaws, a bearing, a drive sleeve, a front sleeve, an annular drive member, a movable ratchet wheel, a reverse locking ratchet wheel, a detent lock ring, a control ring and a control ring outer sleeve. The drive sleeve is positioned in a central hole in the rear end of the body member via a spring ring, drive keys on the drive sleeve can drive the annular drive member and the detent lock ring to rotate, in the chucked state, locked by the control ring. The chuck according to the present invention has the function of self-tightening, preventing the clamping force from being excessive, and of performing reverse rotation operation. The chuck is easy to assembly and disassembly, a tool shank clamped by the chuck will not be loosened due to vibration or shock, and the chuck is adapted for use in tools with various type of shank.

10 Claims, 7 Drawing Sheets

CHUCK

TECHNICAL FIELD

The present invention relates to a drill chucking device, and particularly, to a self-tightened reverse locking chuck.

PRIOR ART

As we all know, a drill chuck in the prior art generally comprises such parts as a body member, jaws, a nut, a nut jacket, a rolling member, an outer sleeve and a locking device. Three jaws are respectively received in three equally spaced angled bores of the body member, the nut is disposed in a nut groove of the body member, the threads of the nut engage with those on the jaws to form a thread transmission mechanism, the nut jacket is connected, with interference, to the nut, the exterior of the nut jacket is provided with the outer sleeve, the inner wall of the outer sleeve is provided with keys, the nut jacket or the nut are provided thereon with key slots, and the outer sleeve is connected to the nut jacket or the nut via the keys. In mounting and use, the body member is directly connected to a transmission shaft of a power-generating machine to drive the body member and further the three jaws and the clamped tool to rotate. The outer sleeve is rotated with hands so that the outer sleeve drives the nut to rotate via the nut jacket, the jaws are driven by the nut via threads to move forward and backward in the angled bores of the body member, thereby causing the three jaws to open or close and realizing the object of loosening or chucking a tool shank. The chuck of this kind is liable to loosen and release the tool shank if being vibrated. In a chuck having a locking device, for example in patented chuck U.S. Pat. No. 5,957,469, after the jaws clamp the tool shank, the locking device relatively secures the nut to the body member so that the nut cannot rotate relative to the body member due to vibration, thereby avoiding the loosening between the jaws and the tool shank. But when subject to relatively strong working resistance, due to elastic deformation of all parts, particularly of the jaws, the clamping force of the jaws for the tool shank will change in a working state so that the tool shank is likely to be loosened. In addition, there is another self-tightened chuck, for example the present applicant's utility model patent ZL00257070.X. In use of said chuck, the resisting moment functions to exert force to and tightly clamp the tool shank, but easily the jaws clamp the tool shank so tightly that the tool shank is hard to remove and that very often the tool shank can only be removed by virtue of specialized tools, therefore causing much inconvenience. Meanwhile, the drill chuck of this kind will automatically loosen and detach in the event of reverse rotation so that it cannot operate in the state of reverse rotation.

SUMMARY OF THE INVENTION

Object of the Invention

The object of the present invention is to overcome the disadvantages in the prior art, and to provide a novel chuck for operations such as drilling and milling, which is reasonably configured, which can automatically exert force and clamp the tool shank and can refrain from exerting an excessive clamping force during operation, from which the tool shank can be conveniently manually removed, and meanwhile which can operate in both positive and reverse rotation states.

BRIEF INTRODUCTION OF THE INVENTION

In order to achieve the above object, the technical solution of the present invention is: a chuck, comprising: a body member, jaws, a nut, a front sleeve and a rolling member, characterized in that a transmission connecting shaft and a spring ring are mounted, with a clearance fit, in a central hole or a rear end of the body member, a rear end of the transmission connecting shaft is connected to a drive sleeve, the drive sleeve has a plurality of drive keys at the front portion thereof, the nut is fixedly connected to an annular drive member, the annular drive member is provided thereon with a plurality of elastic drive detents, a movable ratchet wheel is provided between a thrust face of the body member and the nut, the surface between the movable ratchet wheel and the nut is an antifriction surface, a reverse locking ratchet wheel is fixedly mounted on the body member at a position adjacent to the movable ratchet wheel, a control ring and a detent lock ring are provided on the outer circumference of the movable ratchet wheel and the reverse locking ratchet wheel, the detent lock ring is provided with a plurality of elastic locking detents, the control ring is provided thereon with control keys corresponding to the elastic locking detents, and in that a control ring outer sleeve is provided outside of the drive sleeve and the detent lock ring.

The inner wall of the above drive sleeve can be provided with annular connecting slots; the reverse locking ratchet wheel can be integral with the body member; the annular drive member is provided with a plurality of drive slots; the elastic drive detents of the annular drive member have protrusions; the annular drive member can be integral with the nut jacket; the nut jacket can also be an independent piece and the annular drive member is integral with the detent lock ring; the detent lock ring is provided with a plurality of drive slots; the detent lock ring can have a plurality of connecting keys and the connecting keys have connecting portions at the end thereof; the control ring is provided with protrusions; the detent lock ring is provided with a plurality of drive slots; the inner surface of the control ring outer sleeve is provided with grooves, and the outer surface of the transmission connecting shaft is provided with annular slots; annular slots are provided in the central hole of the rear end of the body member; the inner bore of the drive sleeve is provided with serrations, and the drive sleeve is press fit connected to the transmission connecting shaft; the front portion of the body member is provided with a hole for a wrench or has a multi-prismy structure; the body member has annular protruding edges behind the thrust face.

Due to the above configuration, in the present invention, the transmission connecting shaft can be connected to a power-generating machine such as an electric portable drill and transmits the rotating torque. The transmission connecting shaft remains axially positioned to the body member through the spring ring. The drive keys of the drive sleeve are connected to the drive slots of the annular drive member and the detent lock ring so that the annular drive member, the nut and the detent lock ring can synchronously rotate together with the drive sleeve. The rotation of the transmission connecting shaft is transformed into the advance or retraction of the jaws, that is, clamping or loosening of the tool shank, via the threaded transmission of the nut and the jaws. In operation, the drive sleeve is manually rotated in the positive direction and the drive keys drive the drive slots of the detent lock ring and the protrusions on the elastic drive detents of the annular drive member so that the detent lock ring, the annular drive member, and the nut connected to the annular drive member can rotate together with the drive sleeve relative to the body member and the movable ratchet wheel, and the rotation of the nut drives the jaws to advance to clamp the tool shank. The control ring outer sleeve is rotated to drive the detent control ring to rotate and drive the locking detents of the detent lock ring to engage with the reverse locking ratchet wheel, thereby achieving the reverse locking. In this state, the antifriction surface between the nut and the movable ratchet wheel reduces the frictional resistance so that a greater clamping force can be obtained when the chuck is manually rotated to clamp the tool shank. In operation, when the working resisting moment is relatively great, the drive keys of the drive sleeve press the protrusions on the elastic drive detents of the annular drive member to deform inwardly, then the drive keys continue to advance relative to elastic drive detents, meanwhile driving the control ring and the detent lock ring to synchronously rotate; the elastic locking detents of the detent lock ring and reverse locking ratchet wheel will make relative leaping movement and generate a sound of "click, click" until the drive keys are in contact with the wall of the drive slots of the annular drive member. As drive keys press the protrusions on the elastic drive detents, the elastic drive detents are driven to deform in engagement with the movable ratchet wheel. When the working resistance further increases, the drive keys directly drive the drive slot wall of the annular drive member so that the annular drive member together with the nut tend to continue to rotate relative to the body member and the clamping force of the jaws to the tool shank will meanwhile tend to increase. As the clamping force of the jaws counteracts on the nut through threaded transmission to generate the axial pressure of the nut to the movable ratchet wheel, the frictional force between the movable ratchet wheel and the body member thrust face greatly increases, generating a frictional force moment that prevents the movable ratchet wheel together with the nut and the annular drive member from rotating relative to the body member. Because the frictional force moment functions to limit the rotation of the movable ratchet wheel, the annular drive member and the nut relative to the body member, the increase of the clamping force of the jaws to the tool shank is to some extend limited so that the clamping force cannot unlimitedly increase, so that the tool shank cannot be loosened upon completion of the operation.

In the above state, the elastic locking detents of the detent lock ring are in engagement with and is locked with the reverse locking ratchet wheel, whereby the tool shank will not loosen in the event of reverse rotation operation, thereby overcoming the disadvantage that a common self-tightened chuck cannot operate in the reverse direction.

If the tool shank needs to be released, first the control ring outer sleeve is rotated so that the elastic locking detents disengage with the reverse locking ratchet wheel, then the drive sleeve is rotated in a reverse direction, and the jaws are driven to retract through the threaded transmission of the nut and the jaws to release the tool shank.

MODES FOR CARRYING OUT THE PRESENT INVENTION

Figure 1:
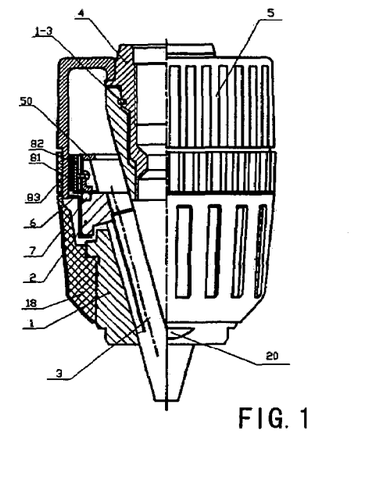
FIG. 1 is a schematic view of the structure of one embodiment of the present invention.
Figure 2:
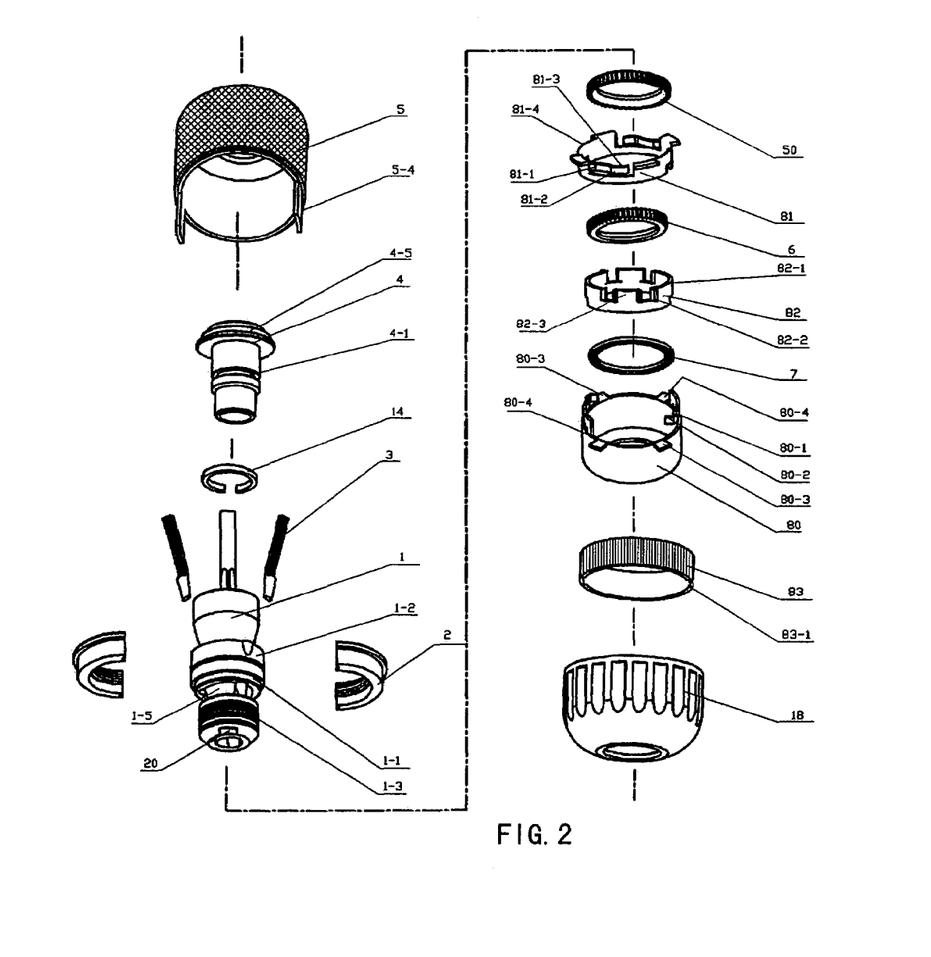
FIG. 2 is an exploded view of the structure of the embodiment as illustrated in FIG. 1.
Figure 3:
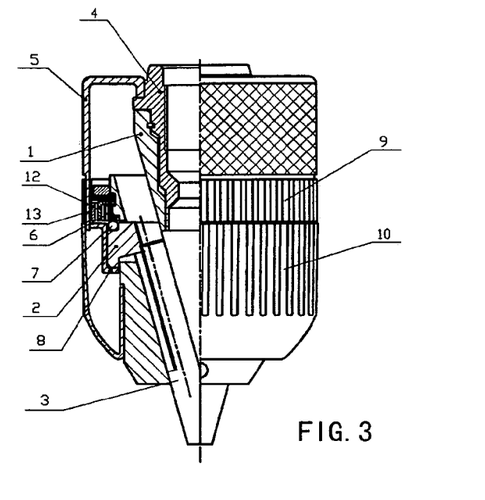
FIG. 3 is a schematic view of the structure of another embodiment of the present invention.
Figure 4:
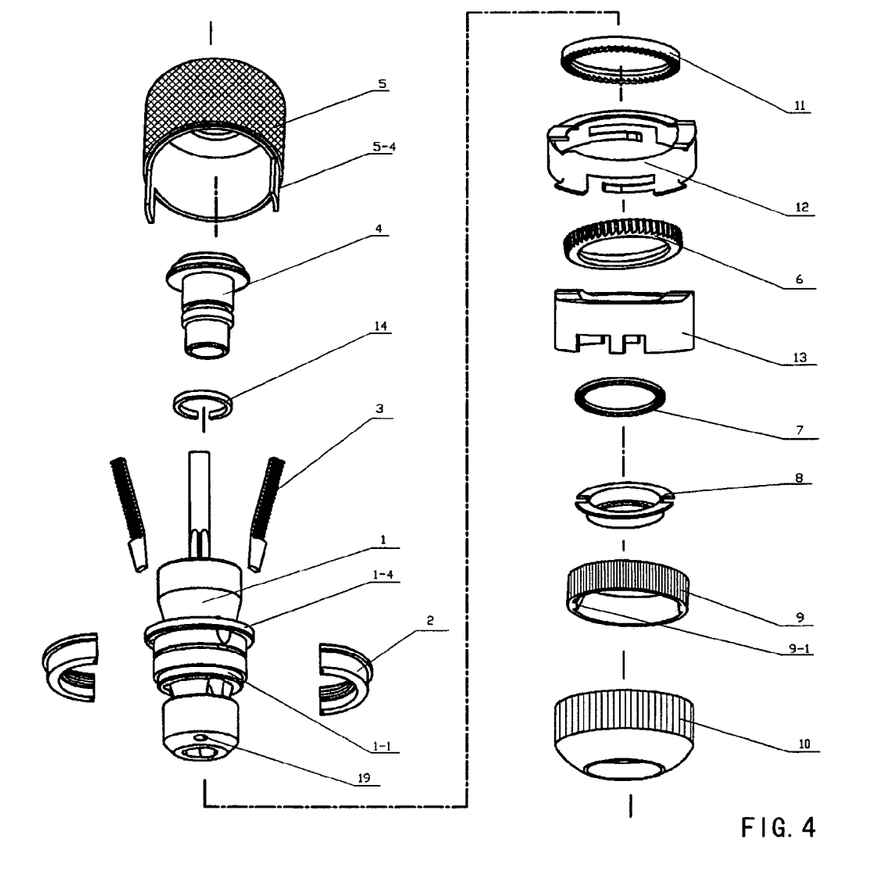
FIG. 4 is an exploded view of the structure of the embodiment as illustrated in FIG. 3.
Figure 5:
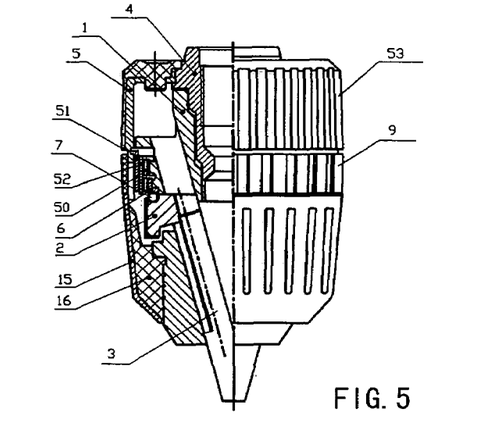
FIG. 5 is a schematic view of the structure of another embodiment of the present invention.
Figure 6:
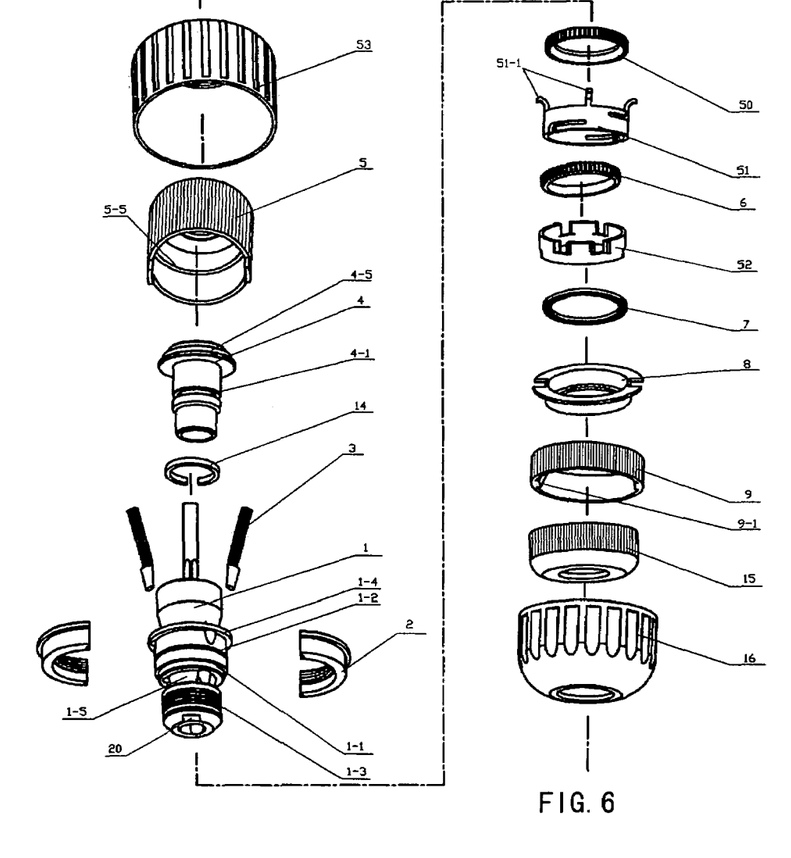
FIG. 6 is an exploded view of the structure of one embodiment as illustrated in FIG. 5.
Figure 9:
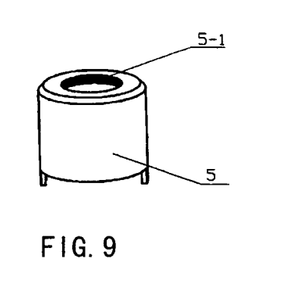
FIGS. 9-13 are schematic views showing different modes of assembly of the drive sleeve and the transmission connecting shaft.
Figure 10:
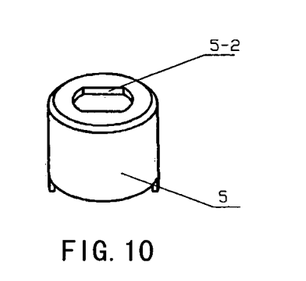
Figure 11:
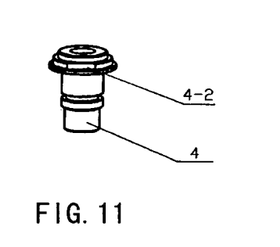
Figure 12:
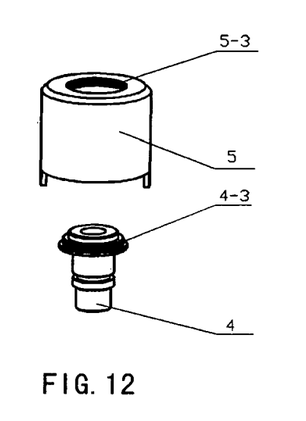
Figure 13:
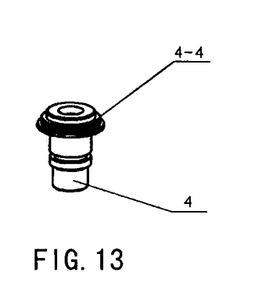

FIG. 1 is a structural schematic view of one embodiment of the present invention. FIG. 2 is an exploded schematic view of said embodiment. As shown in the figures, the present invention comprises a body member 1, a nut 2, jaws 3, a transmission connecting shaft 4, a drive sleeve 5, a movable ratchet wheel 6, a rolling member 7, a spring ring 14, a front sleeve 18, a reverse locking ratchet wheel 50, an annular drive member 80, a detent lock ring 81, a control ring 82, a control ring outer sleeve 83. Three jaws 3 are respectively received in three equally spaced angled bores of the body member 1, and the nut 2 engages with the jaws 3. The body member 1 is provided with a front end outer flange 1-3 having annular and longitudinal furrows, the outer flange being provided thereon with the front sleeve 18, the front end of the body member being provided with a multi-prismy structure 20. According to the present invention, the transmission connecting shaft 4 is mounted together with the body member 1 via the annular slots 1-3 on the body member and the spring ring 14 within a transmission connecting groove 4-1. The drive sleeve 5 is fixedly connected to a rear end portion 4-5 of the transmission connecting shaft; the affixation and connection is effected by means of making serrations 5-1 on the inner bore of the drive sleeve as shown in FIG. 9, and then pressing the drive sleeve into the rear end portion 4-5 of the transmission connecting shaft, or by means of making the connecting bore of the drive sleeve as a flat bore 5-2 as shown in FIG. 10 and then assembling the flat bore 5-2, in interference relationship, with flat curved surface 4-2 of the transmission connecting shaft as shown in FIG. 11, or by means of threaded connection and then locking by punching marks, as shown in FIG. 12, or by means of making the rear end of the transmission connecting shaft to have serrations 4-4 as shown in FIG. 13 and then pressing the read end together with the drive sleeve 5. As shown in FIGS. 1 and 2, the drive sleeve 5 is mounted by inserting drive keys 5-4 in series into the drive slots 81-4 of the detent lock ring, drive slot middle portions 80-4 of the annular drive member, and control ring positions 82-1. The movable ratchet wheel is mounted on the body member 1 with a play and in contact with a thrust face 1-1, the reverse locking ratchet wheel is fixedly mounted on a body member surface 1-2, the nut 2 is mounted in a nut groove 1-5 on the body member adjacent to the thrust face 1-1 and is in threaded engagement with the jaws 3. The rolling member 7 is mounted between the nut 2 and the movable ratchet wheel 6. The annular drive member 80 is affixed and connected to the nut 2. As shown in FIG. 6, the detent lock ring can be allowed to have a structure 51 having a connecting key 51-1, the connecting key 51-1 is coupled to an annular groove 5-5 in the drive sleeve, and an annular protruding edge 1-4 on the body member prevents the connecting key 51-1 from moving backward relative to the body member, thus ensuring that the drive member connected to the connecting key and the transmission connecting shaft will not move backward relative to the body member. The drive sleeve can have a combined structure of an inner sleeve and an outer sleeve, as shown by the reference numerals 5 and 53 in FIG. 6. The front sleeve can also have a combined structure as designated by reference numerals 15 and 16 in FIG. 6. The combined function of the annular drive member 80 and the detent lock ring 81 as shown in FIG. 2 can be replaced by a nut jacket 8 and the detent lock ring 51 as shown in FIG. 6, whereby the control ring 82 is correspondingly replaced by the control ring 52 as shown in FIG. 6. The reverse locking ratchet wheel can have an end face ratchet structure denoted by the reference numeral 11 as shown in FIG. 4, the detent lock ring corresponding thereto has a combined structure of an upper end face elastic locking detent and a elastic drive detent on the outer peripheral wall as shown by the reference numeral 12 in FIG. 4, correspondingly the control ring is as shown by the reference numeral 13 in FIG. 4, and the outer ring outer sleeve is as shown in FIG. 9.

The present invention operates as follows: as shown in FIGS. 1 and 2, the transmission connecting shaft 4 is connected and secured to a transmission component of a power tool, the tool shank is placed between the jaws 3 and the body member 1, the drive sleeve 5 and the front sleeve 10 are respectively held by both hands and rotated in opposite directions, and subsequent chucking and locking are effected in three phases: in the first phase, the drive sleeve 5 is rotated, drive keys 5-4 drive the detent lock ring 81 and the control ring 82 to rotate, meanwhile the drive keys 5-4 contact and thereby drive the protrusions 80-1 on the elastic drive detents of the annular drive member to enable the annular drive member 80 to rotate together with the drive sleeve 5, the detent lock ring 81 and the control ring 82, meanwhile the nut 2 secured to the annular drive member also rotates, and the jaws 3 are moved forward via thread transmission to clamp the tool shank. The operation mode and resultant clamping force in the first phase are similar to those of a common manually tightened drill chuck. In the second phase, the control ring outer sleeve 83 is rotated, and the control ring 82 is meanwhile driven to rotate in the same direction due to the engagement between grooves 83-1 of the control ring outer sleeve and protrusions 82-2 on the control ring, the control keys 82-3 of the control ring press the protrusions 81-2 on the elastic locking detents of the detent lock ring to make the elastic locking detents flex and deform until the protrusions 82-2 of the control ring are in contact with the drive keys 5-4 of the drive sleeve, whereby the elastic locking detents 81-3 engage with the ratchets of the reverse locking ratchet wheel to thereby achieve the reverse locking. In the state of reverse locking, when the power tool drives the chuck and the tool to rotate in a reverse direction, the jaws 3 of the chuck will not release the tool shank, thereby preventing the disadvantage that a common self-tightened drill chuck cannot operate in an opposite direction. Following the above two phases comes the third phase. In the third phase, during operations such as drilling and milling, if the resisting moment in work is greater than the corresponding elastic force that the protrusions 80-1 on the elastic drive detents of the annular drive member can bear, the dynamic force, which is in balance with the resisting moment in work, allows the drive keys 5-4 to press protrusions 80-1 on the elastic drive detents to deform inwardly and then to continue to move forward, meanwhile driving the control ring 82 and the detent lock ring 81 to synchronously rotate; the elastic locking detents 81-3 of the detent lock ring and the ratchets 50-1 of the reverse locking ratchet wheel will make relative leaping movement and generate a sound of "click, click"; the drive keys 5-4 move forward until they are in contact with the drive slot wall 80-3 of the annular drive member, whereby the elastic drive detents 80-2 of the annular drive member deform under the pressing of the drive keys 5-4 and thereby are in engagement with the ratchets 6-1 of the moveable ratchet wheel 6, and in this state, the annular drive member 80 and the nut 2 can only make synchronous and positive movement together with the movable ratchet wheel 6. As the operation resistance continues to increase, the moment of force that the jaws 3 holding the tool shank transmit to the nut 2 via thread transmission increases, the axial pressure exerted by the nut 2 onto the movable ratchet wheel 6 and the body member thrust face 1-1 via the rolling member 7 also increases, and meanwhile the frictional resisting moment between the movable ratchet wheel 6 and the body member thrust body 1-1 increases. The frictional resisting moment restricts the drive keys 5-4 in driving the annular drive member 6 and the nut 2 to rotate relative to the body member 1, thereby restricting the relative movement between the threads of the nut 2 and the threads of the jaws 3, and eventually resulting in the restriction of unlimited increase of the clamping force that the jaws 3 exert on the tool shank.

When the tool shank needs to be released, what to be done is rotated the control ring outer sleeve 83 along with the control ring 82 to allow the control keys 82-3 of the control ring to release the pressure on the protrusions 81-2 on the elastic locking detents of the detent lock ring and to move to the inwardly recessed positions 81-1 of the elastic detents of the detent lock ring such that the elastic locking detents 81-3, due to the elastic restoring force, release the engagement with the ratchets 50-1 of the reverse locking ratchet wheel. The drive sleeve 5 and the front sleeve 18 are rotated in opposite directions such that the drive keys 5-4 pass over the protrusions 80-1 on the elastic drive detents, contact with the drive slot wall 80-4 of the annular drive member, and drive the annular drive member along with the threads of the nut 2 and the jaws 3 to make a relative movement in opposite directions, and the jaws 3 move backward and thereby release the clamping of the tool shank.

Figure 7:
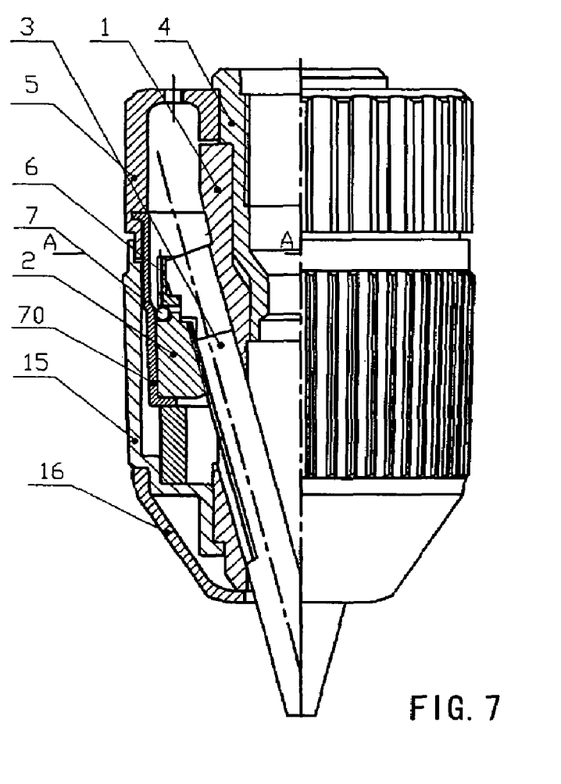
FIG. 7 is a schematic view of the structure of one embodiment of the present invention.
Figure 8:
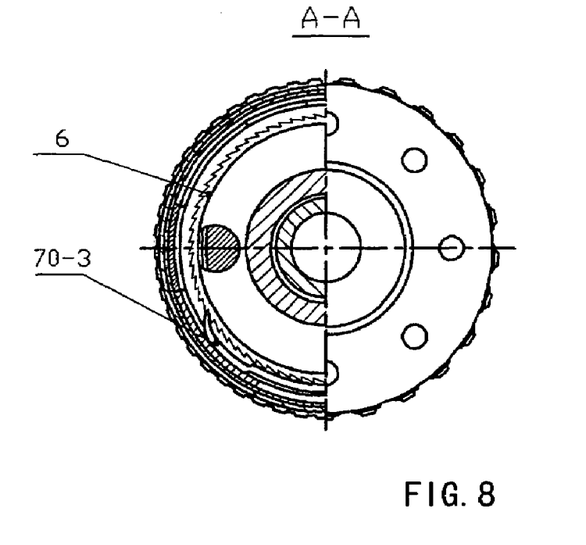
FIG. 8 is a cross-sectional view of FIG. 7.
Figure 16:
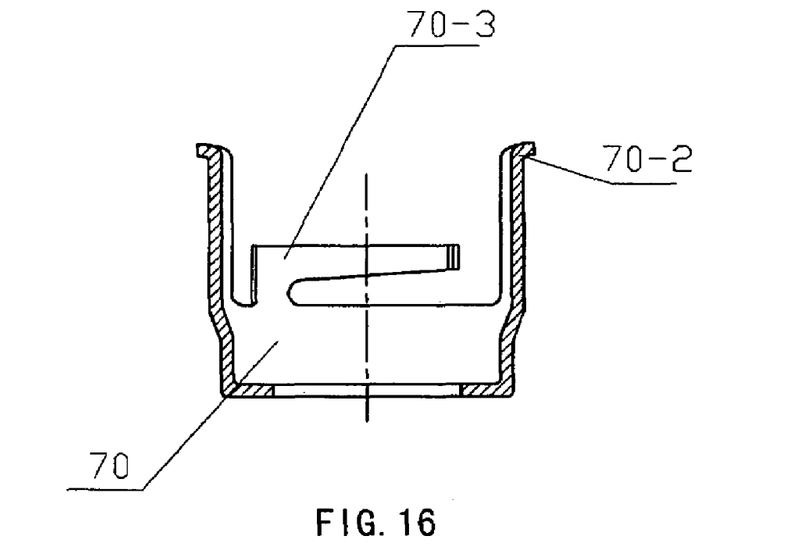
FIG. 16 is a schematic view of the annular drive member of the embodiment as illustrated in FIG. 7.
Figure 17:
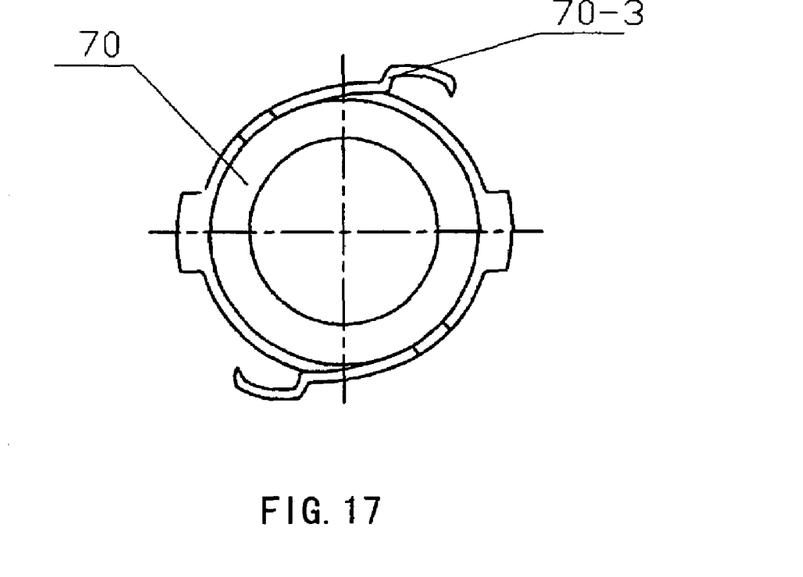
FIG. 17 is a top view of FIG. 16.

FIG. 7 illustrates an embodiment having no reverse locking device, and the structure as illustrated is used for an operation in which no reverse rotation is involved. The reference numeral 70 in FIG. 7 denotes the annular drive member. FIG. 8 is a cross-sectional view of FIG. 7. The numeral 70-3 in FIGS. 8, 16 and 17 denotes a connecting key of the drive detent 70-2.

Figure 14:
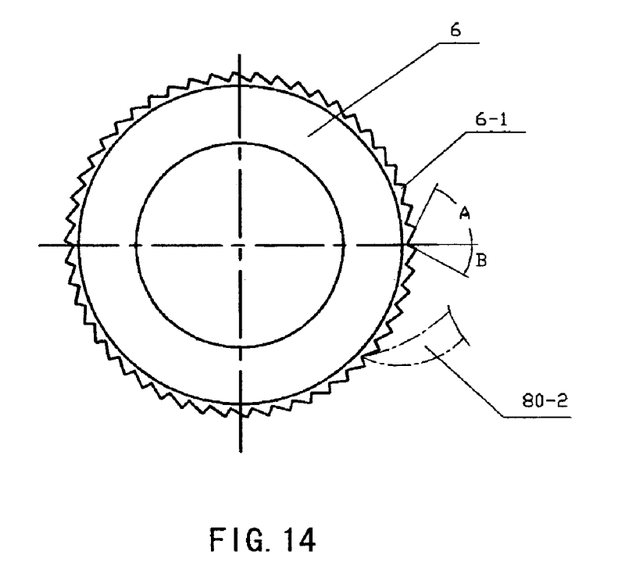
FIG. 14 is a schematic view of the movable ratchet wheel.
Figure 15:
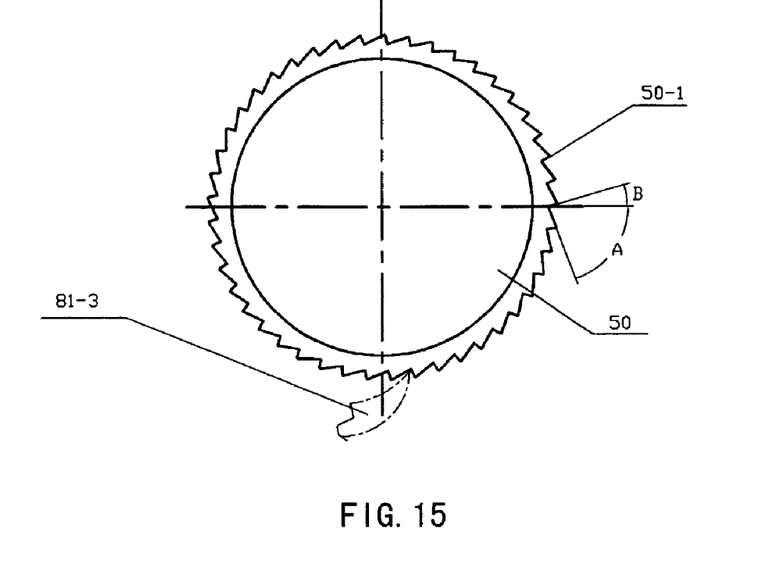
FIG. 15 is a schematic view of the reverse locking ratchet wheel.

FIG. 14 shows a bearing surface of the movable ratchet wheel, with the angle A being less than angle B; FIG. 15 shows a bearing surface of the reverse locking ratchet wheel, with the angle B being less than the angle A.

To sum up, the present invention may further include the following features:

The chuck according to the present invention is characterized in that the ratchets of the reverse locking ratchet wheel are disposed along the outer circumference of the ratchet wheel.

The chuck according to the present invention is characterized in that the ratchets of the reverse locking ratchet wheel are disposed along the end face of the ratchet wheel.

The chuck according to the present invention is characterized in that the ratchets of the moveable ratchet wheel are disposed along the outer circumference of the moveable ratchet wheel.

The chuck according to the present invention is characterized in that the ratchets of the moveable ratchet wheel are disposed along the end face of the moveable ratchet wheel.

The chuck according to the present invention is characterized in that the elastic locking detents on the detent lock ring are provided with protrusions.

The chuck according to the present invention is characterized in that the control ring outer sleeve is provided with grooves or protruding keys for connection to the protrusions of grooves on the control ring.

The chuck according to the present invention is characterized in that the control ring is provided with protrusions or grooves.

The chuck according to the present invention is characterized in that the control ring outer sleeve is provided with grooves or protruding keys for connection to the protrusion or grooves on the control ring.

The chuck according to the present invention is characterized in that the profiled hole of the drive sleeve is fixedly connected to the profiled prism of the transmission shaft.

The chuck according to the present invention is characterized in that the drive sleeve is in threaded connection to the transmission connecting shaft.

The chuck according to the present invention is characterized in that the circular hole of the drive sleeve is in interference fitting with cylindrical surface of the transmission connecting shaft having serrations.

The chuck according to the present invention is characterized in that the front end of the body member is in the shape of multi-prismy surfaces or is provided with a hole for a wrench.

The chuck according to the present invention is characterized in that the rear portion of the nut groove of the body member is provided with an annular protruding edge.

The chuck according to the present invention is characterized in that the drive sleeve comprises an inner sleeve which and an outer sleeve which are fixedly connected to each other, the inner and outer sleeves being made of different materials, the inner sleeve having drive keys, and the outer sleeve having an outer surface with protruding edges and grooves.

The chuck according to the present invention is characterized in that the front sleeve comprises an inner sleeve and an outer sleeve which are fixedly connected to each other, the inner and outer sleeves being made of different materials, and the outer sleeve having an outer surface with protruding edges and grooves.

The invention claimed is:

1. A self-tightened reverse locking chuck, comprising: a body member, jaws, and a nut, three jaws being respectively received in three equally spaced angled bores of the body member, the nut being in threaded transmission with the jaws received in the angled bores of the body member, a transmission connecting shaft being mounted in clearance fit in a central hole of the rear end of the body member, a drive sleeve being fixedly connected to the outside of the rear end of the transmission connecting shaft, a front sleeve being fixedly connected to the front portion of the body member, wherein a plurality of drive keys are disposed along the front circumference of the drive sleeve; a spring ring axially positions the transmission connecting shaft in the central hole of the body member; a movable ratchet wheel is provided between the body member thrust face and the nut; a reverse locking ratchet wheel is fixedly mounted on the body member at a position adjacent to the movable ratchet wheel; a control ring and a detent lock ring are provided on the outside of the movable ratchet wheel and the reverse locking ratchet wheel; the detent lock ring is provided with a plurality of elastic locking detents; the control ring is provided thereon with a plurality of control keys corresponding to the elastic locking detents; a control ring outer sleeve is provided outside of the drive sleeve and the control ring; an annular drive member is fixedly connected to the nut; the annular drive member is provided thereon with a plurality of elastic drive detents, the drive keys on the drive sleeve are connected to the annular drive member and the detent lock ring; the drive sleeve drives the annular drive member and the detent lock ring to rotate; and the control ring outer sleeve is connected to the control ring.

2. A self-tightened reverse locking chuck according to claim 1, wherein the reverse locking ratchet wheel is integral with the body member.

3. A self-tightened reverse locking chuck according to claim 1, wherein the annular drive member is integral with the nut jacket.

4. A self-tightened reverse locking chuck according to claim 1, wherein the annular drive member is separate from the nut jacket.

5. A self-tightened reverse locking chuck according to claim 1, wherein the annular drive member is integral with the detent lock ring.

6. A self-tightened reverse locking chuck according to claim 1, wherein the elastic drive detents on the annular drive member are provided with protrusions.

7. A self-tightened reverse locking chuck according to claim 1, wherein the drive sleeve has a hole with serrations and being connected in interference to the cylindrical surfaces of the transmission connecting shaft.

8. A self-tightened reverse locking chuck according to claim 1, wherein the detent lock ring has connecting keys.

9. A self-tightened reverse locking chuck according to claim 1, wherein the inner wall of the drive sleeve is provided with an annular connecting slot.

10. A self-tightened reverse locking chuck according to claim 1, wherein a plurality of annular slots and longitudinal slots are disposed on the outer circumferential surface of the front portion of the body member.

* * * * *